(12) United States Patent  
Kim (10) Patent No.: US 12,420,697 B2
(45) Date of Patent: Sep. 23, 2025

(54) CARGO FALLING PREVENTION SYSTEM FOR VEHICLE AND CONTROL METHOD

(71) Applicant: HYUNDAI MOBIS Co., Ltd., Seoul (KR)

(72) Inventor: Jae Yoon Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 893 days.

(21) Appl. No.: 17/672,121

(22) Filed: Feb. 15, 2022

(65) Prior Publication Data

US 2022/0258662 A1 Aug. 18, 2022

(30) Foreign Application Priority Data

Feb. 18, 2021 (KR) .......... 10-2021-0021891
Mar. 24, 2021 (KR) .......... 10-2021-0038098
Mar. 30, 2021 (KR) .......... 10-2021-0041191

(51) Int. Cl.
| | |
|---|---|
| B60P 3/035 | (2006.01) |
| B60P 7/06 | (2006.01) |
| B60P 7/12 | (2006.01) |
| B60P 7/135 | (2006.01) |
| G01G 19/08 | (2006.01) |
| G01G 19/12 | (2006.01) |

(Continued)

(52) U.S. Cl.
CPC ............ B60P 7/135 (2013.01); G01G 19/08 (2013.01); G01P 1/02 (2013.01); G01P 3/50 (2013.01); *B60Y 2200/145* (2013.01)

(58) Field of Classification Search
CPC .... B60P 3/035; B60P 7/06; B60P 7/08; B60P 7/12; B60P 7/135; B60Y 2200/145; G01G 19/00; G01G 19/08; G01G 19/12; G01G 19/14; G01P 1/02; G01P 1/023; G01P 1/026; G01P 3/50
See application file for complete search history.

(56) References Cited

U.S. PATENT DOCUMENTS

| | | | |
|---|---|---|---|
| 9,388,942 B2 * | 7/2016 | Sloan ................ | F17C 13/08 |
| 2005/0036858 A1 * | 2/2005 | Ueda ................ | B65G 1/0435 |
| | | | 414/280 |
| 2014/0217107 A1 * | 8/2014 | Sloan ................ | B60P 7/12 |
| | | | 29/428 |

FOREIGN PATENT DOCUMENTS

| | | | | |
|---|---|---|---|---|
| AU | 2019229360 B2 * | 1/2024 | ............ | B60P 1/6463 |
| CN | 114683999 A * | 7/2022 | | |

(Continued)

OTHER PUBLICATIONS

Description Translation for CN 114683999 from Espacenet (Year: 2022).*

(Continued)

*Primary Examiner* — Jason D Shanske
*Assistant Examiner* — Daniel M. Keck
(74) *Attorney, Agent, or Firm* — MORGAN, LEWIS & BOCKIUS LLP (57) ABSTRACT

The present invention provides a cargo falling prevention system for a vehicle and a control method, which can determine a defective loaded state of cargo at an early stage to prevent the cargo from falling off a vehicle so as to avoid a collateral accident. Further, the present invention provides a cargo falling prevention system for a vehicle and a control method, which can allow a driver to recognize falling of cargo and to take a quick action to cope with the falling of the cargo.

19 Claims, 7 Drawing Sheets

(51) Int. Cl.
  *G01P 1/02* (2006.01)
  *G01P 3/50* (2006.01)

(56) References Cited

FOREIGN PATENT DOCUMENTS

| | | | |
|---|---|---|---|
| EP | 1072467 A2 * | 1/2001 | .............. B60P 3/035 |
| KR | 10-0205181 B1 | 4/1999 | |
| KR | 10-1164771 B1 | 7/2012 | |

OTHER PUBLICATIONS

Description Translation for EP 1072467 from Espacenet (Year: 2001).*

* cited by examiner

CARGO FALLING PREVENTION SYSTEM FOR VEHICLE AND CONTROL METHOD

CROSS REFERENCE TO RELATED APPLICATION

The present application claims priority to Korean Patent Application No. 10-2021-0021891, filed Feb. 18, 2021, to Korean Patent Application No. 10-2021-0038098, filed Mar. 24, 2021 and to Korean Patent Application No. 10-2021-0041191, filed Mar. 30, 2021, the entire contents of which is incorporated herein for all purposes by this reference.

BACKGROUND OF THE INVENTION

Field of the Invention

The present invention relates to a cargo falling prevention system for a vehicle and a control method, which can prevent cargo from falling off a vehicle while the vehicle travels.

Description of the Related Art

A cargo vehicle, such as a truck, is equipped with a cargo platform on which cargo is loaded. However, there is a problem in that the cargo falls off the cargo platform of the cargo vehicle because of traveling vibration or wind pressure while the cargo vehicle travels, which causes an accident. In addition, there is also a problem in that the cargo platform moves toward a driver seat and collides with the driver seat when the cargo vehicle suddenly stops, which causes an injury to a driver.

However, in the related art, other than a method of initially fixing the cargo loaded on the cargo platform, there is no solution for recognizing or preventing the falling of the cargo. For this reason, there is a risk of accident due to the falling of the loaded cargo.

The above-mentioned matters described as the background art are provided merely to aid understanding of the background of the present invention, and should not be construed to admit that the matters correspond to the technologies already known to those skilled in the art.

SUMMARY OF THE INVENTION

The present invention is proposed to solve these problems and aims to provide a cargo falling prevention system for a vehicle and a control method, which can determine a defective loaded state of cargo at an early stage to prevent the cargo from falling off a vehicle, which may lead to a collateral accident. Further, the present invention aims to provide a cargo falling prevention system for a vehicle and a control method, which can allow a driver to recognize falling of cargo and to take a quick action to cope with the falling of the cargo.

To achieve the above-mentioned object, a cargo falling prevention system for a vehicle according to the present invention includes: a cargo platform on which cargo is loaded; a movement detector installed at a periphery of the cargo platform and configured to detect a movement of the cargo; a falling prevention device installed on a bottom surface of the cargo platform and operative to be deployed upward from the bottom surface to restrict a motion of the cargo; and a controller configured to control the falling prevention device when information received from the movement detector indicates that the cargo has moved.

The movement detector may include: a motion detector configured to detect the motion of the cargo; and a weight detector configured to measure a weight of the cargo, and the controller may determine whether the cargo is moved on the basis of information on the motion and weight of the cargo.

The motion detector may detect the motion of the cargo based on a position of the cargo and a relative velocity between the cargo and the vehicle, the weight detector may collect the weights of the cargo loaded in the vehicle for a unit time, and the controller may calculate an amount of change in cargo load by comparing the weights collected for the unit time, and when the motion of the cargo is detected, the controller may compare the amount of change in cargo load with a first critical value and determine whether a loaded state of the cargo is a defective state or a falling-off state.

The controller may determine that the loaded state of the cargo is the defective state when a velocity of the cargo is equal to a velocity of the vehicle and the amount of change in cargo load is smaller than the first critical value and equal to or larger than a second critical value after the motion of the cargo is detected.

The controller may determine that the loaded state of the cargo is the falling-off state when a velocity of the cargo is different from a velocity of the vehicle and the amount of change in cargo load is equal to or larger than the first critical value after the motion of the cargo is detected.

The falling prevention device may include: a front device installed at a front side of the cargo platform and configured to be erected rearward while forming a downward inclined surface; and a rear device installed at a rear side of the cargo platform and configured to be erected forward while forming a downward inclined surface.

The front device may include: a front panel disposed at the front side of the cargo platform, configured to cover a part of the bottom surface of the cargo platform, and having a rear end slidably and rotatably installed on the cargo platform; and a front driver rotatably installed on the cargo platform, disposed below the front panel, connected to the front panel, and operative to rotate and slide the front panel forward by extending a length thereof.

A front catching projection may protrude upward from a front end of the front panel.

The rear device may include: a rear panel disposed at the rear side of the cargo platform, configured to cover a part of the bottom surface of the cargo platform, and having a front end slidably and rotatably installed on the cargo platform; and a rear driver rotatably installed on the cargo platform, disposed below the rear panel, connected to the rear panel, and operative to slide and rotate the rear panel rearward by extending a length thereof.

A rear catching projection may protrude upward from a rear end of the rear panel.

The controller may further receive traveling information of the vehicle, control the front device to operate when the vehicle is braked, and control the rear device to operate when the vehicle is accelerated.

The controller may receive information as to whether the cargo is solid, liquid, or gas, store in advance vehicle control according to solid properties, vehicle control according to liquid properties, and vehicle control according to gas properties, and control traveling of the vehicle on the basis of properties of the cargo.

The controller may receive information on the weight of the cargo, correct the vehicle control, which depends on whether the cargo is solid, liquid, or gas, on the basis of the weight of the cargo, and control the traveling of the vehicle.

The controller may control one or more of a traveling speed of the vehicle, a suspension system, a steering system, and a braking device on the basis of properties of the cargo.

The controller may receive material information about the cargo and control traveling of the vehicle on the basis of the material information.

Meanwhile, a cargo falling prevention control method for a vehicle according to the present invention includes: detecting, by a movement detector, whether cargo on a platform of the vehicle has moved, and controlling, by a controller, a falling prevention device to be deployed to restrict a motion of the cargo when information from the movement detector indicates that the cargo has moved.

The detecting may include collecting motions of the cargo and weights of the cargo loaded in the vehicle for a unit time based on a position of the cargo and a relative velocity between the cargo and the vehicle, and the controlling may include: calculating an amount of change in cargo load by comparing the weights collected for the unit time; and comparing the amount of change in cargo load with a first critical value and determining whether a loaded state of the cargo is a defective state or a falling-off state when the motion of the cargo is detected.

The controlling may include determining that the loaded state of the cargo is the defective state when a velocity of the cargo is equal to a velocity of the vehicle and the amount of change in cargo load is smaller than the first critical value and equal to or larger than a second critical value after the motion of the cargo is detected.

The controlling may include determining that the loaded state of the cargo is the falling-off state when a velocity of the cargo is different from a velocity of the vehicle and the amount of change in cargo load is equal to or larger than the first critical value after the motion of the cargo is detected.

The cargo falling prevention system for a vehicle and the control method, which are configured as described above, may determine the defective loaded state of the cargo at an early stage to prevent the cargo from falling off the vehicle, which may lead to a collateral accident. Further, the cargo falling prevention system for a vehicle and the control method may allow the driver to recognize the falling of the cargo and to take a quick action to cope with the falling of the cargo.

DETAILED DESCRIPTION OF THE INVENTION

A cargo falling prevention system for a vehicle and a control method according to an exemplary embodiment of the present invention will be described with reference to the accompanying drawings.

Figure 1:
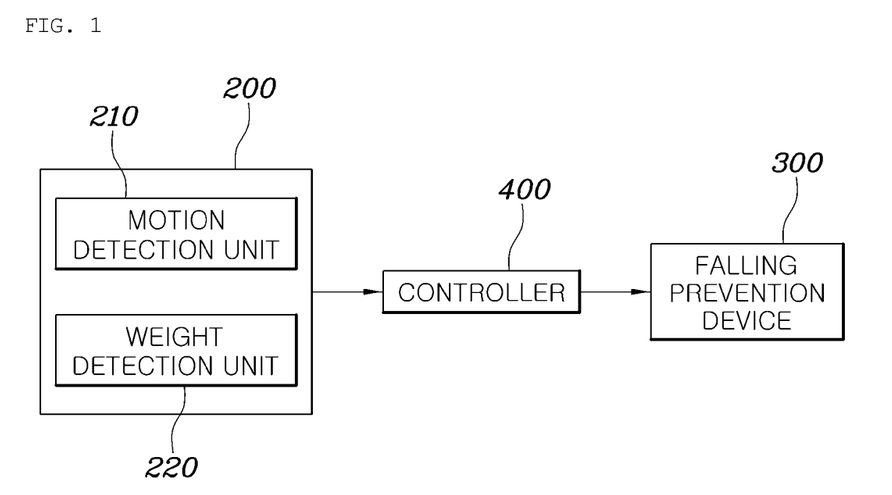
FIG. 1 is a configuration view illustrating a cargo falling prevention system for a vehicle according to the present invention.
Figure 2:
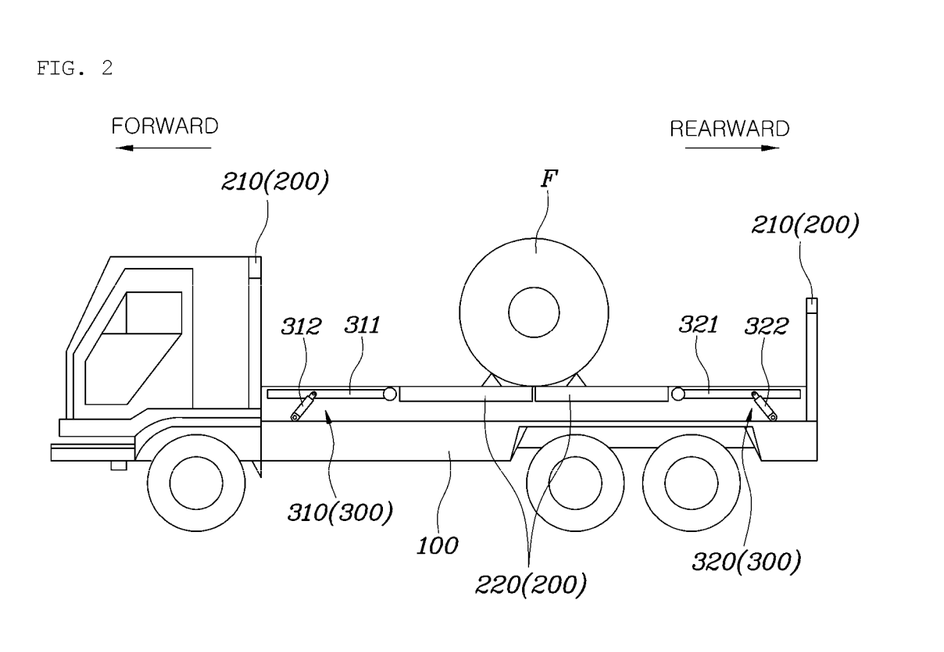
FIG. 2 is a view illustrating the cargo falling prevention system for a vehicle according to the present invention.
Figure 3:
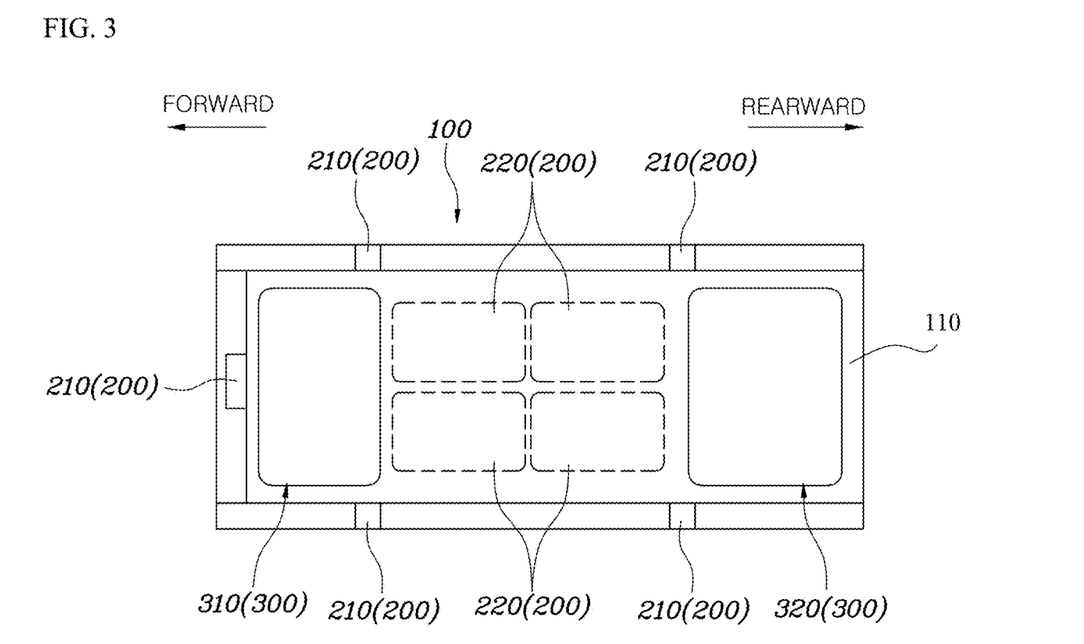
FIG. 3 is a view illustrating a cargo platform and a movement detector according to the present invention.
Figure 4:
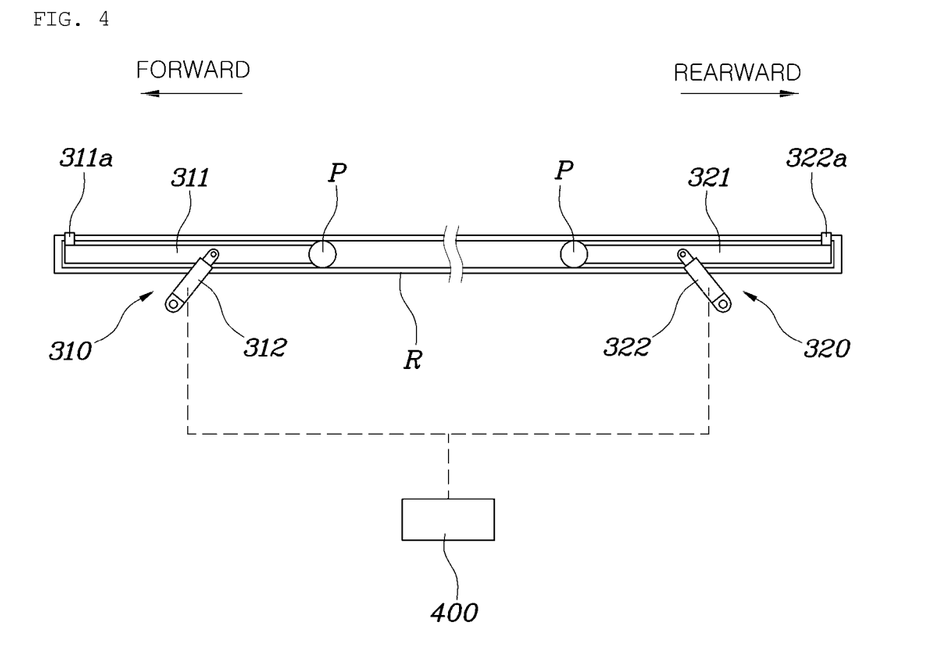
FIG. 4 is a view illustrating a state before a falling prevention device operates.
Figure 5:
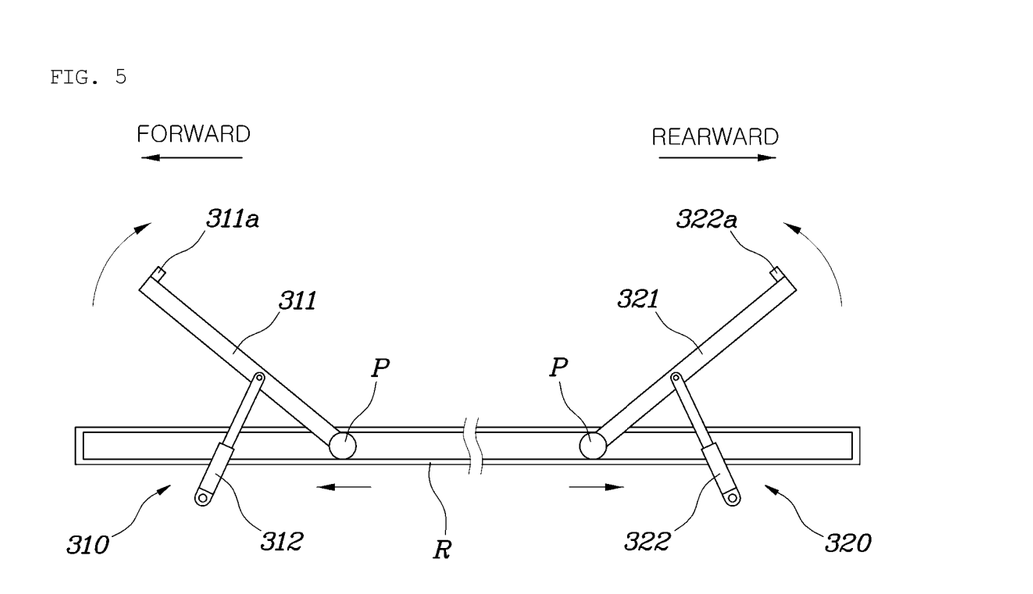
FIG. 5 is a view illustrating a state after the falling prevention device operates.
Figure 6:
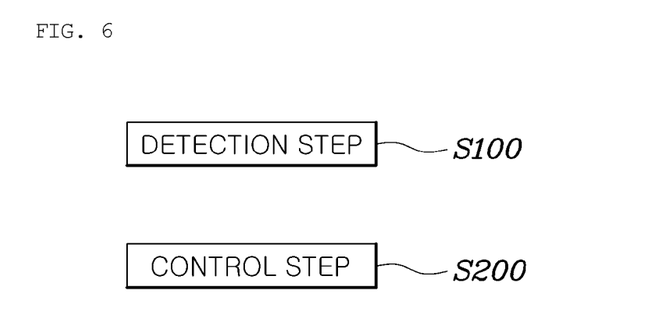
FIG. 6 is a flowchart illustrating a cargo falling prevention control method for a vehicle according to the present invention.
Figure 7:
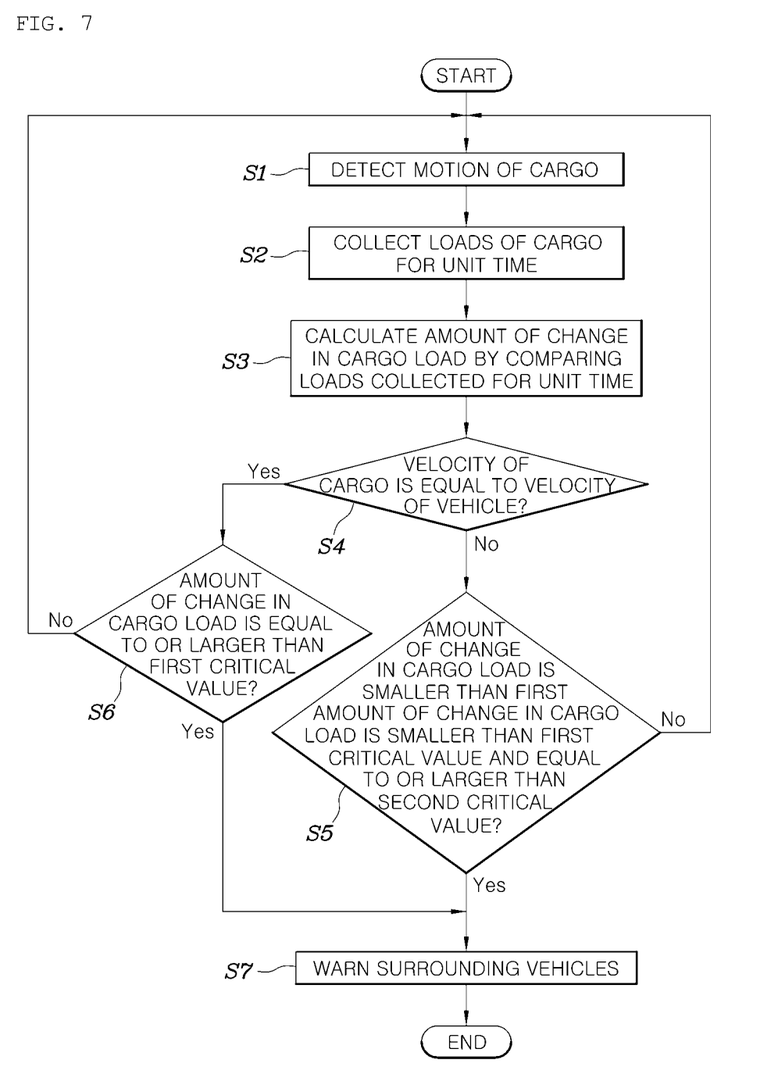
FIG. 7 is a detailed flowchart illustrating the cargo falling prevention control method for a vehicle according to the present invention illustrated in FIG. 6.

FIG. 1 is a configuration view illustrating a cargo falling prevention system for a vehicle according to the present invention, FIG. 2 is a view illustrating the cargo falling prevention system for a vehicle according to the present invention, FIG. 3 is a view illustrating a cargo platform and a movement detector according to the present invention, FIG. 4 is a view illustrating a state before a falling prevention device operates, FIG. 5 is a view illustrating a state after the falling prevention device operates, FIG. 6 is a flowchart illustrating a cargo falling prevention control method for a vehicle according to the present invention, and FIG. 7 is a detailed flowchart illustrating the cargo falling prevention control method for a vehicle according to the present invention illustrated in FIG. 6.

As illustrated in FIGS. 1 to 2, the cargo falling prevention system for a vehicle according to the present invention includes: a cargo platform 100 on which cargo F is loaded; movement detectors 200 installed at a periphery of the cargo platform 100 and configured to detect a movement of the cargo F; a falling prevention device 300 installed on a bottom surface 300 of the cargo platform 100 and configured to restrict a motion of the cargo F by being deployed upward from the bottom surface 300 when the falling prevention device 300 operates; and a controller 400 configured to operate the falling prevention device 300 when information indicating that the cargo F has moved is inputted by the movement detectors 200. In this case, the controller 400 receives information on weight of the cargo F, corrects the vehicle control, which depends on whether the cargo F is solid, liquid, or gas, on the basis of the weight of the cargo F, and controls traveling of the vehicle.

The present invention may be applied to a cargo vehicle having the cargo platform 100 disposed at a rear side of the vehicle. In this case, the cargo platform 100 has the movement detectors 200 configured to detect the movement of the cargo F.

In addition, one or more sensors, which constitute the movement detectors 200, may be disposed at each of the front and rear sides of the vehicle. A front sensor may be disposed at an upper end of a cargo compartment of the vehicle or positioned on a front wheel shaft. A rear sensor may be disposed at a rear end of the cargo compartment of the vehicle or positioned on a rear wheel shaft. Therefore, the movement detectors 200 may be installed at the front and rear sides of the vehicle and detect a position and a relative velocity of the cargo F loaded on an outermost portion in the cargo platform.

As described above, the movement detectors 200 may be installed at an upper side of a vehicle body of the vehicle in which a driver seat is positioned. The movement detector 200 may be provided in plural, and the plurality of movement detectors 200 may be installed at the periphery of the cargo platform 100 to accurately determine the movement of the cargo F.

Meanwhile, the falling prevention device 300 is installed to be deployed upward from the bottom surface of the cargo platform 100. The falling prevention device 300 constitutes the bottom surface at normal times. When the falling prevention device 300 operates, the falling prevention device 300 restricts the movement of the cargo F while being deployed upward. That is, the falling prevention device 300 is deployed to be erected on the bottom surface of the cargo platform 100, such that the movement of the cargo F is restricted by the falling prevention device 300, and the falling of the cargo F is prevented.

The falling prevention device 300 is controlled by the controller 400, and the controller 400 receives, from the movement detectors 200, whether the cargo F is moved. That is, when the controller 400 receives, from the movement detectors 200, the information indicating that the cargo F has moved, the controller 400 controls and operates the falling prevention device 300 so that the deployment of the falling prevention device 300 prevents the cargo F from falling off the cargo platform 100. In this case, the controller 400 may store in advance a reference value set according to the movement amount of the cargo F detected by the movement detectors 200. When the movement amount of the cargo F is equal to or larger than the reference value, the controller 400 may determine that there is a risk that the cargo F may fall off the vehicle.

The present invention will be specifically described. The movement detectors 200 include a motion detector 210 configured to detect a motion of the cargo, and a weight detector 220 configured to measure a weight of the cargo F. The controller 400 determines whether the cargo is moved by using the detected information on the motion and weight of the cargo.

Therefore, the controller 400 may recognize a size of the cargo, a loading position, and properties of the cargo on the basis of the information on the cargo detected by the motion detector 210 and recognize the information on the weight of the cargo detected by the weight detector 220. Therefore, the controller 400 may recognize and store the properties of the cargo on the basis of the information received from the motion detector 210 and the weight detector 220. Further, the controller 400 may determine whether the cargo falls off the vehicle by recognizing the movement of the cargo on the basis of the information from the motion detector 210 and the weight detector 220.

Specifically, the motion detector 210 may be configured as a radar sensor, a camera sensor, or a lidar to detect the motion of the cargo on the basis of a position of the cargo and a relative velocity between the cargo and the vehicle.

The weight detector 220 may be configured as a sensor such as a load cell capable of measuring the weight to collect the weights of the cargo loaded on the vehicle for a unit time.

Therefore, the controller 400 calculates the amount of change in cargo load by comparing the weights collected for the unit time. When the motion of the cargo is detected, the controller 400 compares the amount of change in cargo load with a first critical value and determines that the loaded state of the cargo is a defective state or a falling-off state.

That is, the controller 400 collects the weights of the loaded cargo for a predetermined unit time and determines the loaded state of the cargo on the basis of the collected information on the motion of the cargo and the amount of change in cargo load. Specifically, the controller 400 may determine that the loaded state of the cargo is a defective state when the velocity of the cargo is equal to the velocity of the vehicle, the relative velocity is 0 m/s, and the amount of change in cargo load is smaller than the first critical value and equal to or larger than a second critical value after the motion of the cargo is detected.

The defective loaded state means a state in which the cargo has not fallen off the vehicle but is highly likely to fall off the vehicle. That is, the defective loaded state means a state in which a part of the loaded cargo departs or deviates from the initial position while the vehicle travels on a curve or a state in which the position of the cargo is greatly changed as the cargo is loosened while the vehicle goes over a speed bump. In this case, the velocity of the cargo and the velocity of the vehicle are equal to each other because the cargo moves together with the vehicle. However, when the position of the cargo is changed, the load of the cargo detected by the movement detector 200 is different from the initial load. Therefore, the controller 400 determines the loaded state of the cargo by collecting the information. When the controller 400 determines that the loaded state is the defective state, the controller 400 may control the falling prevention device 300 or warn the driver through an instrument panel or the like installed in the vehicle.

In addition, the controller 400 determines that the loaded state of the cargo is the falling-off state when the velocity of the cargo and the velocity of the vehicle are different from each other and the amount of change in cargo load is equal to or larger than the first critical value after the motion of the cargo is detected.

The cargo may fall off the vehicle when the vehicle suddenly travels on a curve or suddenly accelerates. The defective loaded state of the cargo generally leads to the falling of the cargo, but it is necessary to quickly take a subsequent action when the cargo suddenly falls off the vehicle. When the cargo falls off the vehicle, the motion detector 210 detects the motion of the cargo, and the weight detector 220 detects the load decreased by as much as the weight of the cargo that has fallen off the vehicle. The relative velocity is not 0 m/s because the velocity of the cargo is different from the velocity of the vehicle, and the amount of change in cargo load may be measured as being equal to or larger than the first critical value because the amount of change in cargo load is as much as the load of the cargo that has fallen off the vehicle. Therefore, the controller 400 may determine that the loaded state of the cargo is the falling-off state, and then the controller 400 may control the falling prevention device 300 or warn the driver through the instrument panel or the like installed in the vehicle.

Meanwhile, as illustrated in FIGS. 2 to 5, the falling prevention device 300 includes a front device 310 installed at a front side of the cargo platform 100 and configured to be erected rearward while forming a downward inclined surface, and a rear device 320 installed at a rear side of the cargo platform 100 and configured to be erected forward while forming a downward inclined surface.

As described above, the falling prevention device 300 includes the front device 310 installed at the front side of the cargo platform 100, and the rear device 320 installed at the rear side of the cargo platform 100. That is, the front device 310 restricts a forward movement of the cargo F when the cargo F loaded on the cargo platform 100 moves forward, and the rear device 320 restricts a rearward movement of the cargo F when the cargo F loaded on the cargo platform 100 moves rearward. In particular, a loading space is ensured on the cargo platform 100 in a state in which the front device 310 and the rear device 320 are laid on the bottom surface of the cargo platform 100. In a situation in which the cargo F moves, the front device 310 and the rear device 320 are erected toward the center of the cargo platform 100 while forming the downward inclined surfaces, thereby guiding the cargo F so that the cargo F moves toward the center of the cargo platform 100. When the front device 310 and the rear device 320 are erected, the falling of the cargo F from the front and rear sides of the cargo platform 100 is restricted.

In detail, the front device 310 includes: a front panel disposed at the front side of the cargo platform 100, configured to cover a part of the bottom surface of the cargo platform 100, and having a rear end slidably and rotatably installed on the cargo platform 100; and a front driver rotatably installed on the cargo platform 100, disposed below the front panel, connected to the front panel, and configured to rotate and slide the front panel forward by extending a length thereof while operating.

The front panel 311 has a flat surface to cover a part of the bottom surface of the cargo platform 100, and the rear end of the front panel 311 may be slidably and rotatably installed on the cargo platform 100.

Therefore, the cargo platform 100 has guide rails R disposed at two opposite sides of the cargo platform 100, and guide pins P protrude from two opposite ends of the rear end of the front panel 311 and are inserted into the guide rails R, thereby constituting a connection structure. Therefore, the guide pins P of the front panel 311 may move along the guide rails R, and the front panel 311 may rotate about the guide pins P.

In this case, a front catching projection 311a may protrude upward from a front end of the front panel 311. Since the front catching projection 311a is formed at the front end of the front panel 311 as described above, the front catching projection 311a is positioned at the front side of the cargo platform 100 without interfering with the cargo F, and the front catching projection 311a prevents the cargo F from moving along the front panel 311 and falling off the vehicle when the front panel 311 is rotated and erected.

The front driver 312 may be configured as a linear actuator and rotate and slide the front panel 311 by pushing the front panel 311 by extending the length thereof while operating. The front driver 312 is rotatably installed on the cargo platform 100 to allow the front panel 311 to smoothly rotate and move.

Meanwhile, the rear device 320 includes: a rear panel disposed at the rear side of the cargo platform 100, configured to cover a part of the bottom surface of the cargo platform 100, and having a front end slidably and rotatably installed on the cargo platform 100; and a rear driver rotatably installed on the cargo platform 100, disposed below the rear panel, connected to the rear panel, and configured to rotate and slide the rear panel rearward by extending a length thereof while operating.

The rear panel 321 has a flat surface to cover a part of the bottom surface of the cargo platform 100, and the front end of the rear panel 321 may be slidably and rotatably installed on the cargo platform 100.

Therefore, the cargo platform 100 has guide rails R at two opposite sides of the cargo platform 100, and guide pins P protrude from two opposite ends of the front end of the rear panel 321 and are inserted into the guide rails R, thereby constituting a connection structure. Therefore, the guide pins P of the rear panel 321 may move along the guide rails R, and the rear panel 321 may rotate about the guide pins P.

In this case, a rear catching projection 322a may protrude upward from a rear end of the rear panel. Since the rear catching projection 322a is formed at the rear end of the rear panel 321 as described above, the rear catching projection 322a is positioned at the rear side of the cargo platform 100 without interfering with the cargo F, and the rear catching projection 322a prevents the cargo F from moving along the rear panel 321 and falling off the vehicle when the rear panel 321 is rotated and erected.

The rear driver 322 may be configured as a linear actuator and rotate and slide the rear panel 321 by pushing the rear panel 321 by extending the length thereof while operating. The rear driver 322 is rotatably installed on the cargo platform 100 to allow the rear panel 321 to smoothly rotate and slide.

Meanwhile, the controller 400 further receives traveling information of the vehicle. The controller 400 operates the front device 310 while the vehicle is braked, and the controller 400 operates the rear device 320 while the vehicle is accelerated.

That is, the cargo F loaded on the cargo platform 100 moves forward because of inertia while the vehicle is braked, and thus the controller 400 operates the front device 310 to restrict the forward movement of the cargo F. In addition, the cargo F moves rearward while the vehicle is accelerated, and thus the controller 400 operates the rear device 320 to restrict the rearward movement of the cargo F. As described above, the controller 400 controls the operation of the front device 310 or the rear device 320 by predicting the movement of the cargo F on the basis of the traveling state of the vehicle, thereby preventing the cargo F loaded on the cargo platform 100 from falling off the vehicle.

Meanwhile, the controller 400 receives information as to whether the cargo is solid, liquid, or gas and stores in advance the vehicle control according to the solid properties, the vehicle control according to the liquid properties, and the vehicle control according to the gas properties. Further, the controller 400 controls the traveling of the vehicle on the basis of the properties of the cargo.

When the cargo is solid, the center of gravity of the cargo is fixed, and the cargo does not move in a state in which the cargo is normally fixed to the cargo platform 100. In addition, when the cargo is liquid, the cargo freely moves in the cargo platform 100, and the center of gravity of the cargo platform 100 varies at normal times. In addition, when the cargo is gas, the cargo moves less than when the cargo is liquid, and the cargo has a relatively low weight.

For example, when the cargo is solid, the center of gravity of the cargo fixed to the cargo platform 100 is fixed. However, when the cargo is liquid, the center of gravity of the cargo varies because of the free motion of the cargo. As described above, depending on the properties of the cargo, the influence exerted on the vehicle by inertia at the time of quickly starting or suddenly braking the vehicle varies, and the influence exerted on the vehicle by the cargo at the time of turning the vehicle varies.

Therefore, the controller 400 stores in advance the vehicle control according to each cargo property based on experimental data related to the traveling properties of the vehicle that vary depending on whether the solid cargo, the liquid cargo, or the gas cargo is loaded on the cargo platform 100. Therefore, the controller controls the vehicle on the basis of the properties of the cargo, thereby maintaining the traveling stability of the vehicle and preventing the cargo from falling off the vehicle.

For example, the controller 400 softens damping properties of a suspension system when the cargo is solid, and the controller 400 hardens the damping properties of the suspension system when the cargo is liquid or gas. In addition, the controller 400 may control turning traveling or braking force on the basis of the center of gravity that varies depending on the properties of the cargo loaded on the cargo platform 100.

The influence exerted on the vehicle varies depending on the weight of the cargo. That is, the amount of change in center of gravity according to the weight while the vehicle travels is larger when the cargo is liquid than when the cargo is solid. Therefore, the controller 400 corrects the vehicle control on the basis of the weight of the cargo, and differently sets the vehicle control correction depending on whether the cargo is solid, liquid, or gas. Therefore, the controller 400 stably controls the traveling of the vehicle on the basis of the amount of change in weight according to the properties of the cargo.

The property of the cargo or the posture control of the vehicle according to the weight, which is stored in advance in the controller 400, may be derived from experiments and stored in advance or the posture control of the vehicle may be changed flexibly by a sensing device, thereby enabling the vehicle to stably travel.

Meanwhile, as illustrated in FIG. 6, a cargo falling prevention control method for a vehicle according to the present invention includes: a detection step S100 of detecting a movement of cargo; and a control step S200 of operating the falling prevention device when the information indicating that the cargo has moved is inputted.

In this case, the detection step S100 collects the motions of the cargo and the weights of the cargo loaded in the vehicle for the unit time based on the position of the cargo and the relative velocity between the cargo and the vehicle. The control step S200 calculates the amount of change in cargo load by comparing the weights collected for the unit time. When the motion of the cargo is detected, the control step S200 compares the amount of change in cargo load with the first critical value and determines whether the loaded state of the cargo is the defective state or the falling-off state.

That is, the control step S200 determines that the loaded state of the cargo is the defective state when the velocity of the cargo is equal to the velocity of the vehicle and the amount of change in cargo load is smaller than the first critical value and equal to or larger than the second critical value after the motion of the cargo is detected.

In addition, the control step S200 determines that the loaded state of the cargo is the falling-off state when the velocity of the cargo is different from the velocity of the vehicle and the amount of change in cargo load is equal to or larger than the first critical value after the motion of the cargo is detected.

The control according to the present invention may be performed on the basis of steps S1 to S7 of the flowchart illustrated in FIG. 7.

The controller 400 may include a processor or a microprocessor. Optionally, the controller 400 may also include a memory. The aforementioned operations/functions of the controller 400 can be embodied as computer readable code/algorithm/software stored on the memory thereof which may include a non-transitory computer readable recording medium. The non-transitory computer readable recording medium is any data storage device that can store data which can thereafter be read by the processor or the microprocessor. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc. The processor or the microprocessor may perform the above described operations/functions of the controller 400, by executing the computer readable code/algorithm/software stored on the non-transitory computer readable recording medium.

The cargo falling prevention system for a vehicle and the control method, which are configured as described above, may determine the defective loaded state of the cargo at an early stage to prevent the cargo from falling off the vehicle, which may lead to a collateral accident. Further, the cargo falling prevention system for a vehicle and the control method may allow the driver to recognize the falling of the cargo and to take a quick action to cope with the falling of the cargo.

While the specific embodiments of the present invention have been illustrated and described, it will be obvious to those skilled in the art that the present invention may be variously modified and changed without departing from the technical spirit of the present invention defined in the appended claims.

What is claimed is:

1. A cargo falling prevention system for a vehicle, the cargo falling prevention system comprising:
   a cargo platform on which cargo is loaded;
   a movement detector installed at a periphery of the cargo platform and configured to detect a movement of the cargo;
   a falling prevention device installed on a bottom surface of the cargo platform and operative to be deployed upward from the bottom surface to restrict a motion of the cargo; and
   a controller configured to control the falling prevention device to operate when information received from the movement detector indicates that the cargo has moved.

2. The cargo falling prevention system of claim 1, wherein the movement detector comprises:
   a motion detector configured to detect the motion of the cargo; and
   a weight detector configured to measure a weight of the cargo, and
   wherein the controller determines whether the cargo is moved on the basis of information on the motion and weight of the cargo.

3. The cargo falling prevention system of claim 2, wherein the motion detector detects the motion of the cargo based on a position of the cargo and a relative velocity between the cargo and the vehicle, the weight detector collects the weights of the cargo loaded in the vehicle for a unit time, and the controller calculates an amount of change in cargo load by comparing the weights collected for the unit time, and
   wherein when the motion of the cargo is detected, the controller compares the amount of change in cargo load with a first critical value and determines whether a loaded state of the cargo is a defective state or a falling-off state.

4. The cargo falling prevention system of claim 3, wherein the controller determines that the loaded state of the cargo is the defective state when a velocity of the cargo is equal to a velocity of the vehicle and the amount of change in cargo load is smaller than the first critical value and equal to or larger than a second critical value after the motion of the cargo is detected.

5. The cargo falling prevention system of claim 3, wherein the controller determines that the loaded state of the cargo is the falling-off state when a velocity of the cargo is different from a velocity of the vehicle and the amount of change in cargo load is equal to or larger than the first critical value after the motion of the cargo is detected.

6. The cargo falling prevention system of claim 1, wherein the falling prevention device comprises:
   a front device installed at a front side of the cargo platform and configured to be erected rearward while forming a downward inclined surface; and
   a rear device installed at a rear side of the cargo platform and configured to be erected forward while forming a downward inclined surface.

7. The cargo falling prevention system of claim 6, wherein the front device comprises:
- a front panel disposed at the front side of the cargo platform, configured to cover a part of the bottom surface of the cargo platform, and having a rear end slidably and rotatably installed on the cargo platform; and
- a front driver rotatably installed on the cargo platform, disposed below the front panel, connected to the front panel, and operative to rotate and slide the front panel forward by extending a length thereof.

8. The cargo falling prevention system of claim 7, wherein a front catching projection protrudes upward from a front end of the front panel.

9. The cargo falling prevention system of claim 6, wherein the rear device comprises:
- a rear panel disposed at the rear side of the cargo platform, configured to cover a part of the bottom surface of the cargo platform, and having a front end slidably and rotatably installed on the cargo platform; and
- a rear driver rotatably installed on the cargo platform, disposed below the rear panel, connected to the rear panel, and operative to slide and rotate the rear panel rearward by extending a length thereof.

10. The cargo falling prevention system of claim 9, wherein a rear catching projection protrudes upward from a rear end of the rear panel.

11. The cargo falling prevention system of claim 6, wherein the controller further receives traveling information of the vehicle,
- wherein the controller controls the front device to operate when the vehicle is braked, and
- wherein the controller controls the rear device to operate when the vehicle is accelerated.

12. The cargo falling prevention system of claim 1, wherein the controller receives information as to whether the cargo is solid, liquid, or gas, stores in advance a vehicle control according to solid properties, a vehicle control according to liquid properties, and a vehicle control according to gas properties, and controls traveling of the vehicle on the basis of properties of the cargo.

13. The cargo falling prevention system of claim 12, wherein the controller receives information on the weight of the cargo, corrects the vehicle control, which depends on whether the cargo is solid, liquid, or gas, on the basis of the weight of the cargo, and controls the traveling of the vehicle.

14. The cargo falling prevention system of claim 12, wherein the controller controls one or more of a traveling speed of the vehicle, a suspension system, a steering system, and a braking device on the basis of properties of the cargo.

15. The cargo falling prevention system of claim 1, wherein the controller receives material information about the cargo and controls traveling of the vehicle on the basis of the material information.

16. A cargo falling prevention control method for a vehicle, the method comprising:
- detecting, by a movement detector, whether cargo on a platform of the vehicle has moved; and
- controlling, by a controller, a falling prevention device to be deployed to restrict a motion of the cargo when information from the movement detector indicates that the cargo has moved.

17. The cargo falling prevention control method of claim 16, wherein the detecting comprises collecting motions of the cargo and weights of the cargo for a unit time based on a position of the cargo and a relative velocity between the cargo and the vehicle, and
wherein the controlling comprises:
- calculating an amount of change in cargo load by comparing the weights collected for the unit time; and
- comparing the amount of change in cargo load with a first critical value and determining whether a loaded state of the cargo is a defective state or a falling-off state when the motion of the cargo is detected.

18. The cargo falling prevention control method of claim 17, wherein the controlling comprises determining that the loaded state of the cargo is the defective state when a velocity of the cargo is equal to a velocity of the vehicle and the amount of change in cargo load is smaller than the first critical value and equal to or larger than a second critical value after the motion of the cargo is detected.

19. The cargo falling prevention control method of claim 17, wherein the controlling comprises determining that the loaded state of the cargo is the falling-off state when a velocity of the cargo is different from a velocity of the vehicle and the amount of change in cargo load is equal to or larger than the first critical value after the motion of the cargo is detected.

* * * * *